US007246782B2

(12) United States Patent
Crookham et al.

(10) Patent No.: US 7,246,782 B2
(45) **Date of Patent: *Jul. 24, 2007**

(54) APPARATUS AND METHOD FOR A TEMPORARY SPREAD FOOTING

(75) Inventors: Joe P. Crookham, Oskaloosa, IA (US); David M. Crookham, Oskaloosa, IA (US); James A. Whitson, Oskaloosa, IA (US); Thomas A. Stone, University Park, IA (US); Gregory N. Kubbe, Ottumwa, IA (US); Walter R. Tippett, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/845,007

(22) Filed: May 13, 2004

(65) Prior Publication Data

US 2004/0211877 A1 Oct. 28, 2004

Related U.S. Application Data

(63) Continuation of application No. 10/157,062, filed on May 28, 2002, which is a continuation of application No. 09/217,975, filed on Dec. 21, 1998, now Pat. No. 6,464,196.

(51) Int. Cl.
*F16M 13/00* (2006.01)

(52) U.S. Cl. .................... 248/519; 52/123.1; 52/736.1

(58) Field of Classification Search ................ 248/519, 248/346.03, 346.05, 345.07, 161, 406.2, 248/163.1, 164, 431, 183.1, 186.1, 167, 163.2, 248/235, 240.1; 52/123.1, 126.1, 736.1, 52/736.2; 362/404, 413, 414, 249, 250, 486, 362/410; 182/179.1, 178.1, 63.1
See application file for complete search history.

(56) References Cited

U.S. PATENT DOCUMENTS

| | | | | | |
|---|---|---|---|---|---|
| 294,860 | A | * | 3/1884 | Dye | 182/51 |
| 3,452,837 | A | * | 7/1969 | Herrell et al. | 182/17 |
| 3,586,270 | A | | 6/1971 | Loffler | |
| 4,181,929 | A | * | 1/1980 | Barber et al. | 362/192 |
| 4,220,981 | A | * | 9/1980 | Koether | 362/486 |
| 4,228,489 | A | | 10/1980 | Martin | |

(Continued)

FOREIGN PATENT DOCUMENTS

| | | |
|---|---|---|
| AU | B-20518/92 | 1/1983 |
| CA | 2035014 | 11/1999 |
| ES | 2 105 960 | 10/1997 |
| FR | 2 276 446 | 1/1976 |

(Continued)

*Primary Examiner*—A. Joseph Wujciak, III
(74) *Attorney, Agent, or Firm*—McKee, Voorhees & Sease, P.L.C.

(57) ABSTRACT

An apparatus and method for providing a temporary spread footing for supporting a variety of different vertically extending structures. The apparatus includes a frame with a top and bottom. The frame can have a substantial space or void in between the top and bottom into which weights or devices can be placed. A connection on top of the base removably connects to the structure to be supported. Outriggers could also be used to substantially increase the overturning moment resistance of the base. The outriggers can be removable or retractable so that for transportation, the base has minimum dimensions. The method includes pre-determining the needed weight and overturning moment resistance for a particular application and transporting the base to the site and thereafter adding weight and adjusting outriggers to match the pre-determined needed overturning moment resistance.

34 Claims, 12 Drawing Sheets

U.S. PATENT DOCUMENTS

| | | | | |
|---|---|---|---|---|
| 4,319,311 | A | 3/1982 | Mitchell | |
| 4,423,471 | A | 12/1983 | Gordin et al. | |
| 4,450,507 | A | 5/1984 | Gordin et al. | |
| 4,569,416 | A * | 2/1986 | Stokoe | 182/2.9 |
| 4,712,167 | A | 12/1987 | Gordin et al. | |
| 5,207,747 | A | 5/1993 | Gordin et al. | |
| 5,313,378 | A | 5/1994 | Gordin et al. | |
| 5,337,221 | A | 8/1994 | Gordin et al. | |
| 5,398,478 | A | 3/1995 | Gordin et al. | |
| 5,509,502 | A * | 4/1996 | Beaulieu | 187/242 |
| 5,531,419 | A | 7/1996 | Gustafsson et al. | |
| 5,600,537 | A | 2/1997 | Gordin et al. | |
| 5,623,786 | A | 4/1997 | DeMeyer | |
| 5,757,597 | A | 5/1998 | Frank, Sr. | |
| 5,808,450 | A * | 9/1998 | Chula et al. | 322/22 |
| 5,944,413 | A | 8/1999 | Crookham et al. | |
| 6,340,790 | B1 | 1/2002 | Gordin et al. | |
| 6,398,392 | B2 | 6/2002 | Gordin et al. | |
| 6,446,408 | B1 | 9/2002 | Gordin et al. | |
| 6,464,196 | B1 * | 10/2002 | Crookham et al. | 248/519 |

FOREIGN PATENT DOCUMENTS

| | | |
|---|---|---|
| WO | WO 98/14676 | 4/1998 |
| WO | WO 00/37753 | 6/2000 |

* cited by examiner

| WIND SPEED (mph) | BASE MOMENT ARM (ft) | PLS WEIGHT REQUIRED (lbs) |
|---|---|---|
| 70 | 2.5 | 14,900 |
| | 5 | 7,500 |
| | 7 | 5,400 |
| 65 | 2.5 | 12,900 |
| | 5 | 6,500 |
| | 7 | 4,600 |
| 60 | 2.5 | 10,900 |
| | 5 | 5,500 |
| | 7 | 3,900 |
| 55 | 2.5 | 9,200 |
| | 5 | 4,600 |
| | 7 | 3,300 |
| 50 | 2.5 | 7,600 |
| | 5 | 3,800 |
| | 7 | 2,700 |
| 45 | 2.5 | 6,200 |
| | 5 | 3,100 |
| | 7 | 2,200 |
| 40 | 2.5 | 4,900 |
| | 5 | 2,400 |
| | 7 | 1,700 |
| 35 | 2.5 | 3,700 |
| | 5 | 1,800 |
| | 7 | 1,300 |
| 30 | 2.5 | 2,700 |
| | 5 | 1,400 |
| | 7 | 1,000 |

190 192

*Fig. 16*

APPARATUS AND METHOD FOR A TEMPORARY SPREAD FOOTING

BACKGROUND OF THE INVENTION

A. Field of the Invention

The present invention relates to bases or supports for vertically extending or elevating structures, and, in particular, to portable or temporary footings or bases for the same.

B. Problems in the Art

A wide variety of ways to support vertically extending structures have been developed over time. Special considerations come into play for structures that extend substantial distances vertically, and further, when the structures may experience forces that tend to tip the structures, such as wind.

Structure and stability issues become even more acute in situations where support for the vertical structure is desired to be portable or temporary. If the foundation or base cannot utilize any permanent footings in the ground, a primary source for providing stability to a vertical structure does not exist.

A few specific examples will illustrate this point. Situations exist where it would be desirous to have high-powered, wide area lighting, but on a temporary basis. The practical problems are, first, how does one transport such a system, especially when it is desirable to have the lights elevated to substantial distances vertically in the air; and second, how does one support and keep stable such elevated lighting fixtures through a variety of environmental conditions such as winds?

One situation where wide-area portable lighting is desired is with regard to construction sites. There are existing systems for temporary construction site lighting which tend to be on portable trailers or trucks. Lighting fixtures can be installed on foldable or extendible booms or frames. These types of conventional portable lighting units generally each require a separate vehicle to transport them from location to location. Also, they tend to be able to elevate the lights no more than perhaps 15' to 35'. This does not allow for large area lighting. Additionally, because the lights are relatively close to the ground, glare problems can exist for workers and for traffic. Still further, many of these lighting systems are limited in height and number of lights, because of limitations of the base. Basically, existing systems tend to be no more than just a few light fixtures on a scaffold or foldable tower that does not extend very far into the air.

Some truck-based systems with larger, extendible booms exist. For example, U.S. Pat. Nos. 4,423,471, 4,712,167, 5,207,747, and 5,313,378 disclose high-powered lighting fixtures which can be extended much higher in the air (much over 30') and are portable because they are mounted to trucks. However, such systems are expensive, both in original cost and operation, especially for areas such as constructions sites. Also, the trucks on which the fixtures are mounted would be out of use during the time the portable lighting was in use.

Therefore, a system has been developed which essentially consists of a transportable base that can be transported on conventional over-the-road trucks such as semi-trailers, can be manipulated by forklifts, and which can support a substantial sized light pole and array of light fixtures. Such a system is disclosed in commonly owned and co-pending U.S. Ser. No. 08/853,173. This system is relatively low-cost, can support a very tall vertical structure, and is portable. However, it is not adjustable in a variety of situations.

For example, such a base is pre-manufactured and fixed in perimeter size and in weight. It is also fixed in all dimensions and characteristics. If selected for a certain use, it may not be functional for another use. It may support a 50' pole with five (5) 30" diameter light fixtures in low-wind or no-wind conditions, but not be able to support the same in substantial winds.

Therefore, with regard to temporary lighting, there is a real need in the art for an improved system which provides more flexibility and adjustability over a wide variety of situations.

Similar problems exist with regard to supporting or elevating other types of structures. For example, there is a need for a more versatile and flexible footing or base-support for vertical towers, scaffolds, and trusses that are not needed on a permanent basis.

It is therefore a principal objective of the present invention to provide an apparatus and method for a temporary spread footing that solves or overcomes the problems or deficiencies in the art. Other objects, features, and advantages of the present invention include an apparatus and method for temporary spread footing that:

1. Have a known resistance to overturning moment, but which are adjustable for variable attachments and conditions.
2. Have expandable dimensions and weight as compared to when configured for transport.
3. Allow interchangeable devices and add-on devices to be utilized.
4. Provide for a more efficient use of space and strength for a supporting base or footing.
5. Are adaptable and flexible for many situations and for moving, both at a location or site and to a different location or site.
6. Can be utilized with a variety of different vertical or elevated structures.
7. Are economical, efficient, and durable.

These and other objects, features, and advantages of the present invention will become more apparent with reference to the accompanying specification and claims.

SUMMARY OF THE INVENTION

The present invention includes an apparatus and method for a portable base or spread footing. The apparatus includes a frame-work that further includes a mount for a weight. The top of the frame-work includes a connection to which a structure can be removably attached. The top and bottom of the frame-work are spaced apart. A space or open area can be intentionally defined by the frame-work between the top and bottom into which can be placed one or more removable devices. The frame-work can also support a plurality of outriggers extendible from the base.

The method of the invention includes constructing a base frame with a substantial opening between top and bottom. The size of the base-frame is such that it can be transported in conventional, over-the-road vehicles. The structure to be elevated and supported is pre-evaluated. From the pre-evaluation, an appropriate amount of weight is added to the base frame-work and outriggers can be utilized to provide needed stability and resistance to overturning moment for the particular structure.

A variety of configurations can be created with the frame-work by interchangeable devices such as weights, on-board power generators, and other equipment. A variety of different structures can be supported and elevated to withstand various environmental factors such as wind.

BRIEF DESCRIPTION OF THE DRAWINGS

FIG. 16 is a depiction of a placard or chart useable by an operator of the invention to determine outrigger length and total weight of the system for varying wind speeds to resist overturning.

DETAILED DESCRIPTION OF THE PREFERRED EMBODIMENT

A. Overview

Figure 1:
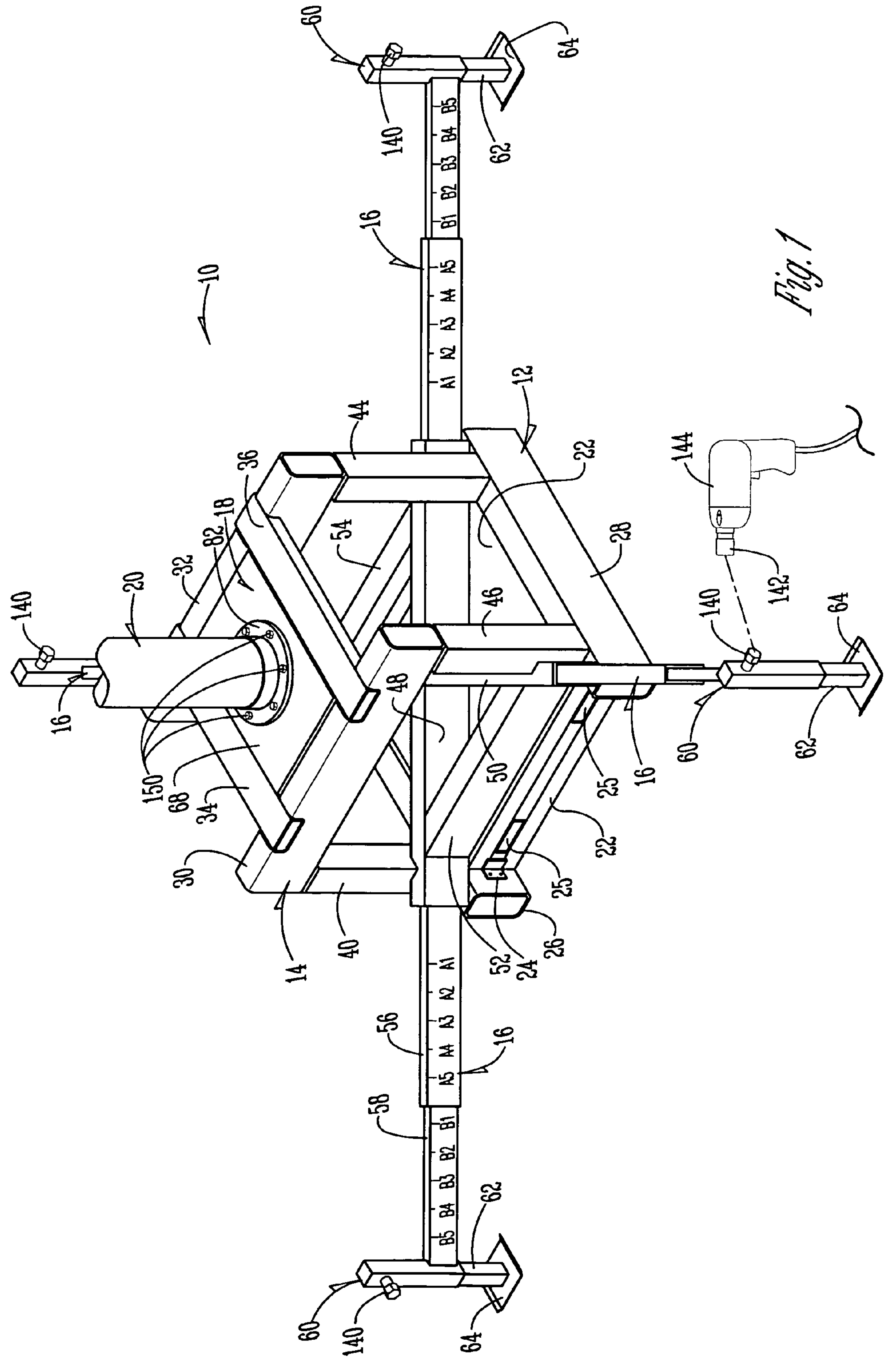
FIG. 1 is a perspective view of a preferred embodiment of the invention supporting a vertical pole (partially shown).

For a better understanding of the invention, a preferred embodiment will now be described in detail. Frequent reference will be taken to the drawings. References numerals or letters will be used to indicate certain parts or locations in the drawings. The same reference numerals or letters will be used to indicate the same parts and locations throughout the drawings unless otherwise indicated.

B. Environment of the Preferred Embodiment

The Preferred embodiment will be discussed in the context of a portable, temporary base or spread footing to support a substantial length, vertically positioned pole, that supports a plurality of high-intensity, wide-area lighting fixtures. By substantial, it is meant that the poles are much longer than 20' to 30'. The light fixtures are high-intensity arc lamps placed in bowl-shaped reflectors of approximately 2' to 3' in diameter. These types of fixtures are the same or similar to those that are conventionally used for outdoor sports lighting. An example of these lights are Musco Sports Lighting Model Sports Cluster II, Level VIII, or TLC available from Musco Sports Lighting, Inc., Oskaloosa, Iowa.

The environment and context of the preferred embodiment will also be with respect to the use of such lights for a construction site or similar lighting. The lights will therefore be outdoors and subject to the range of environmental conditions that may exist at any location, including winds of substantial velocity and varying ground and terrain topography and make-up.

It is to be understood that other analogous uses of lights of this nature are possible. It is also to be understood that other uses for supporting structures are possible with the base.

C. Apparatus of the Preferred Embodiment

FIG. 1 illustrates a base 10 according to the present invention. Base 10 includes a bottom (indicated generally at 12), a top (indicated generally at 14), outriggers 16 and a connection member (indicated generally at 18), on top 14 for connection to a vertical pole 20. As can be seen by FIG. 1, bottom 12 consists of parallel tubes 26 and 28. Top 14 comprises parallel tubes 30 and 32 (turned 90° from tubes 26 and 28) with cross-members 34 and 36. Corner tubes 40, 42 (see FIG. 3), 44, and 46 extend between top 14 and bottom 12. Cumulatively, corner tubes 40, 42, 44, 46, top 14 and bottom 12 define a box-type frame-work.

Completing base 10 are two tubes 48 and two tubes 50 (in a cross shape) and side tubes 52 and 54. Each of the foregoing components of frame or base 10 can be welded or otherwise rigidly connected. Pieces 34 and 36 may or may not be tubular and are welded or otherwise attached into cut-out recesses in the tops of tubes 30 and 32. Similarly, cross-shaped tubes 48 and 50 can be welded into position in cut-outs in corner tubes 40, 42, 44, and 46, and converge to a central area at their opposite ends.

Vertical tubes 40, 42, 44, and 46 could be 6" by 6" steel tubing or 5" by 5".

FIG. 1 illustrates the four outriggers 16. Each outrigger 16 comprises a telescoping arm (here made up of first telescoping section 56 and a second telescoping section 58) each of which telescopes out of an open end (at each corner tube 40, 42, 44, and 46) of one of tubes 48 or 50. A jack 60 at or near the distal end of section 58 of outriggers 16 includes a ground contacting foot 64 at the end of an extendible leg 62. Foot 64 can be adjusted along the axis of leg 62 by a manually operated handle 66.

The frame 10 therefore has outer dimensions that basically define a box. It is primarily made of tubing and has substantial open space between top 14 and bottom 12. Frame 10 is therefore strong but comparatively light. It cam be moved and transported relatively easily. The feet 64 at the ends of outriggers 16 can be positioned substantially away from the frame to greatly increase the overall "foot print" or lateral spread of base 10 on the ground and thus the resistance to overturning moment.

As illustrated in FIG. 1, a weight 22 (for example, concrete) is mountable to bottom 12 of base 10 by mounts 24 (only two shown). Weight 22 could include slots or openings 25 configured to receive the forks of a forklift that could grab weight 22 and maneuver it into position relative to frame or base 10 to then allow attachment of mounts 24 to frame or base 10. It would also allow the forklift to grab the combined weight 22 and base 10 (and/or pole 20 and anything suspended by pole 20) to move the combination.

FIG. 1 further illustrates that pole 20 could be attached at its lower end to a plate 68. Plate 68 in turn could be positioned between tubes 34 and 36 and include some type of releasable locking mechanism (not shown) to hold plate 68 in place and yet allow releasable attachment and detachment from base 10.

Pole 20 could have a lower flange 82 which could be bolted to plate 18 by bolts 150 to form a 16" bolt circle with 8¾" bolts (See FIG. 1).

In the preferred embodiment the following is a table of cross-sectional dimensions and thickness of certain of the parts:

| REF. # | HEIGHT | WIDTH | THICKNESS |
|---|---|---|---|
| 22 | 48" | 48" | 10" (approx. 3,000 lbs.) |
| 26/28 | 6" | 12" | ¼" w |
| 30/32 | 6" | 12" | ¼" w |
| 34/36 | 3" | 8" | ⅜" w |
| 40/42/44/46 | 6" | 6" | ⅜" w |
| 48 | 5" | 9" | 5/16" w (36⅞" long) |
| 50 | 6" | 10" | ¼" w (×33 15/16" long) |
| 52/54 | 6" | 9" | ¼" w |
| 56 | 5" | 9" | ¼" w (×33 15/16" long) |
| 58 | 4" | 8" | ¼" w (×33 15/16" long) |
| 68 | 24" | 36" | 1" |

Each of the tubing members of base 10 can be ASTM A500 Grade B steel structural tubing.

Following is a table of some other dimensions as indicated by the corresponding reference letters in the drawings (see particularly FIGS. 2, 3, and 4):

| REF. LETTER | INCHES |
|---|---|
| A | 10" |
| B | 10" |
| C | 24" |
| D | 10" |
| E | 48" |
| F | 48" |
| G | 60" |
| H | 48" |
| I | 10" |
| J | 60" |
| K | 24" |
| L | 108" |
| M | 54" radius |
| N | 54" |
| O | 36" (min) |
| P | 12" |
| Q | 108" square |

Figure 2:
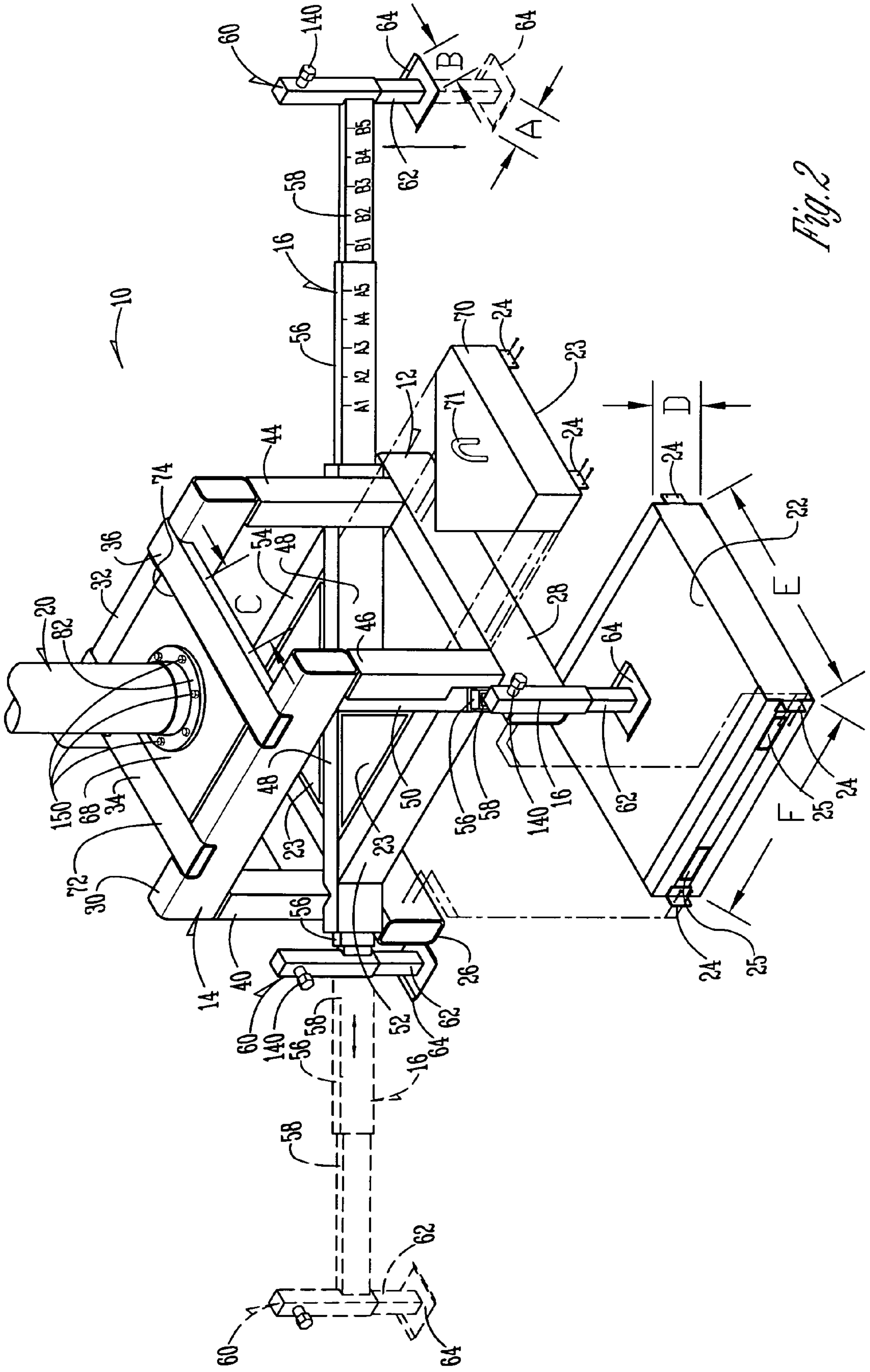
FIG. 2 is similar to FIG. 1, but shows in an exploded view weights that can be removably attached to the base framework and, with broken lines, shows the maneuverability and adjustability of the outriggers.

Therefore FIGS. 1 and 2 illustrate the basic structure of the apparatus according to the preferred embodiment of the invention. Base 10 comprises a box-like tubular frame having a substantially open space between the top 14 and bottom 12. An open space between tubes 26 and 28 of bottom 12 allow a heavy (in the preferred embodiment around 2,000 lbs.) concrete block to be moved therebetween and removably mounted. This weight, therefore, would exist at the lower-most or in or near the bottom-most plane of base 10.

The space in base 10 could be used for storage. Examples are tool box(es), job box(es), parts, tools, generators, electrical components, or other components associated with what might be elevated on the pole.

On the other hand, top 14 of base 10 extends a substantial distance above the bottom of base 10 and provides, in perimeter dimensions, a fairly large platform area upon which a structure can be mounted.

Outriggers 16 allow the diameter of base 10 to be almost doubled in size with a corresponding substantial increase in the resistance to overturning moment, as opposed to just base 10 itself. Jacks 60 can be any of a wide variety of devices, but in the preferred embodiment can be trailer jacks manually operated. An example of jack 60 is Bulldog 10,000-lb capacity Top Wind Heavy Duty Trailer Jack. Other types are possible.

FIG. 2 is similar to FIG. 1, but shows in exploded form the detachment of a concrete weight 22 (by disconnecting brackets 24 from frame 10 held in place by bolts). Additionally, FIG. 2 illustrates that one or more further weights, such as indicated at 70, could be placed into base 10, if desired. Weight 70 has a triangular end which would mate in between crossed-tubes 48 and 50 above the location of weight 22 when mounted to base 10. Therefore, several additional weights 70, configured to mate into or attach to base 10 could be also be utilized to add additional weight to base 10.

FIG. 2 also shows mounting straps 72 and 74 which extend between pieces 34 and 36 of base 10 and can lock down plate 68 to base 10. Removable straps 72 and 74 allow plate 68 and pole 20 (attached to plate 68 by bolting of pole flange 82 to plate 68 or otherwise) to be removed from base 10.

FIG. 2 also shows in ghost lines the extendibility and retractability of outriggers 16, as well as the adjustability of foot 64 transversely to the longitudinal axis of the outriggers 16.

Figure 3:
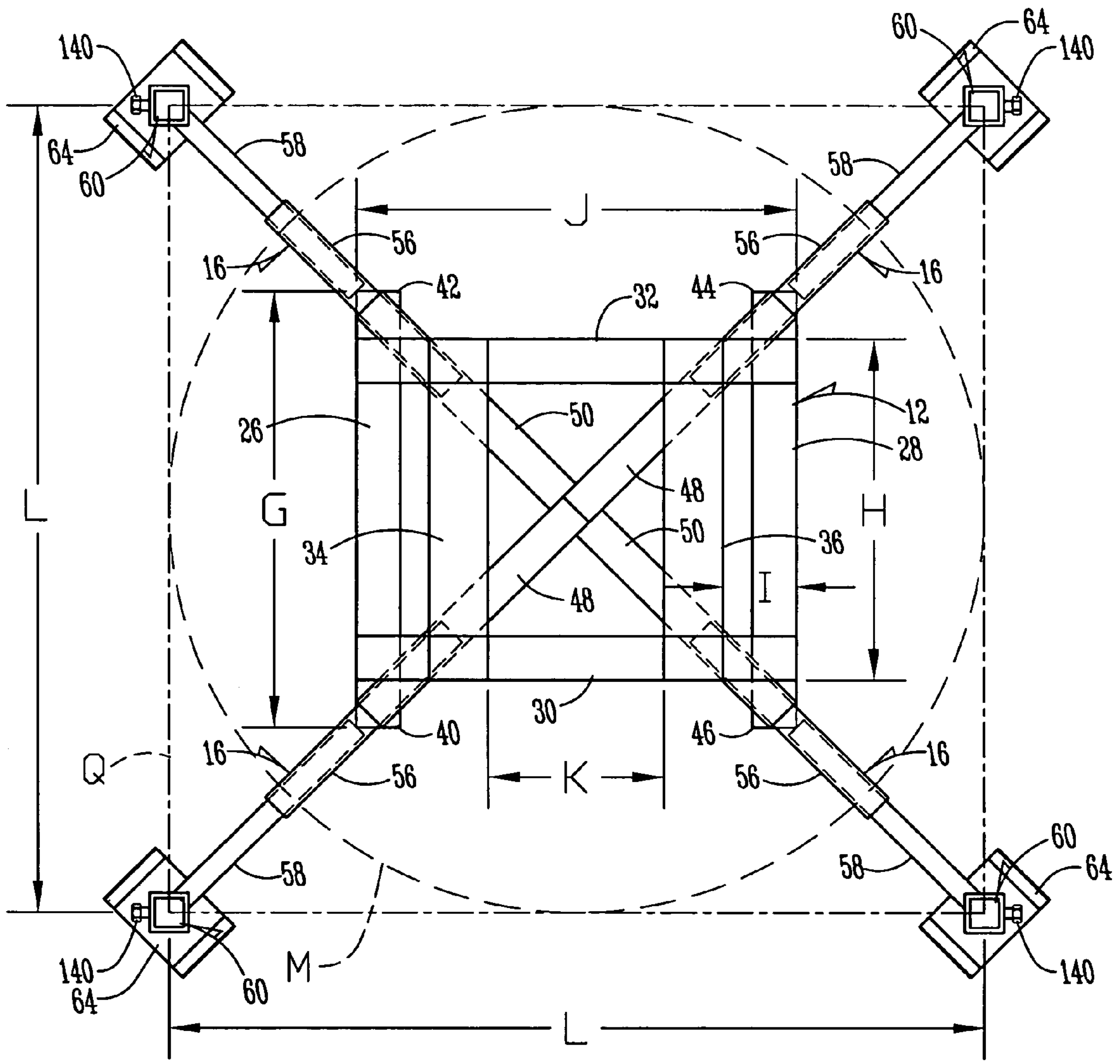
FIG. 3 is a top plan view of FIG. 1.

FIG. 3 illustrates the substantial increase in resistance to overturning moment made possible by outriggers 16 versus just the outer dimensions of base 10. Circle M (54" radius) indicates the basic resistance to overturning moment presented by the outriggers 16. Circle M is inscribed within a box Q which is 108" square and is defined by the outer ends of outriggers 16. The "foot print", so to speak, of base 10 (108"×108") and the 54" moment arm, along with the substantial weight that can be added to base 10, provides a substantial footing that resists overturning moment for a substantial load and any expected forces against that load. The tubular members and other structural members of base 10 are selected to be of enough strength to support any weight added thereto, as well as any stresses caused by the load and forces against on or against it. On the other hand, FIGS. 2 and 3 illustrate that when outriggers 16 are retracted back into base 10 and weights 22 and 70 are removed, the perimeter dimensions are approximately 5' by 5'. FIG. 2 shows that the height of base 10, with pole 20 removed, is around 5' tall. This structure would therefore easily fit within conventional over-the-road transportation such as semi-trailer trucks. Removability of weights 22 and 70 and the size of base 10 would allow even several of bases 10 to be transported in conventional semi-trailer trucks.

Figure 4:
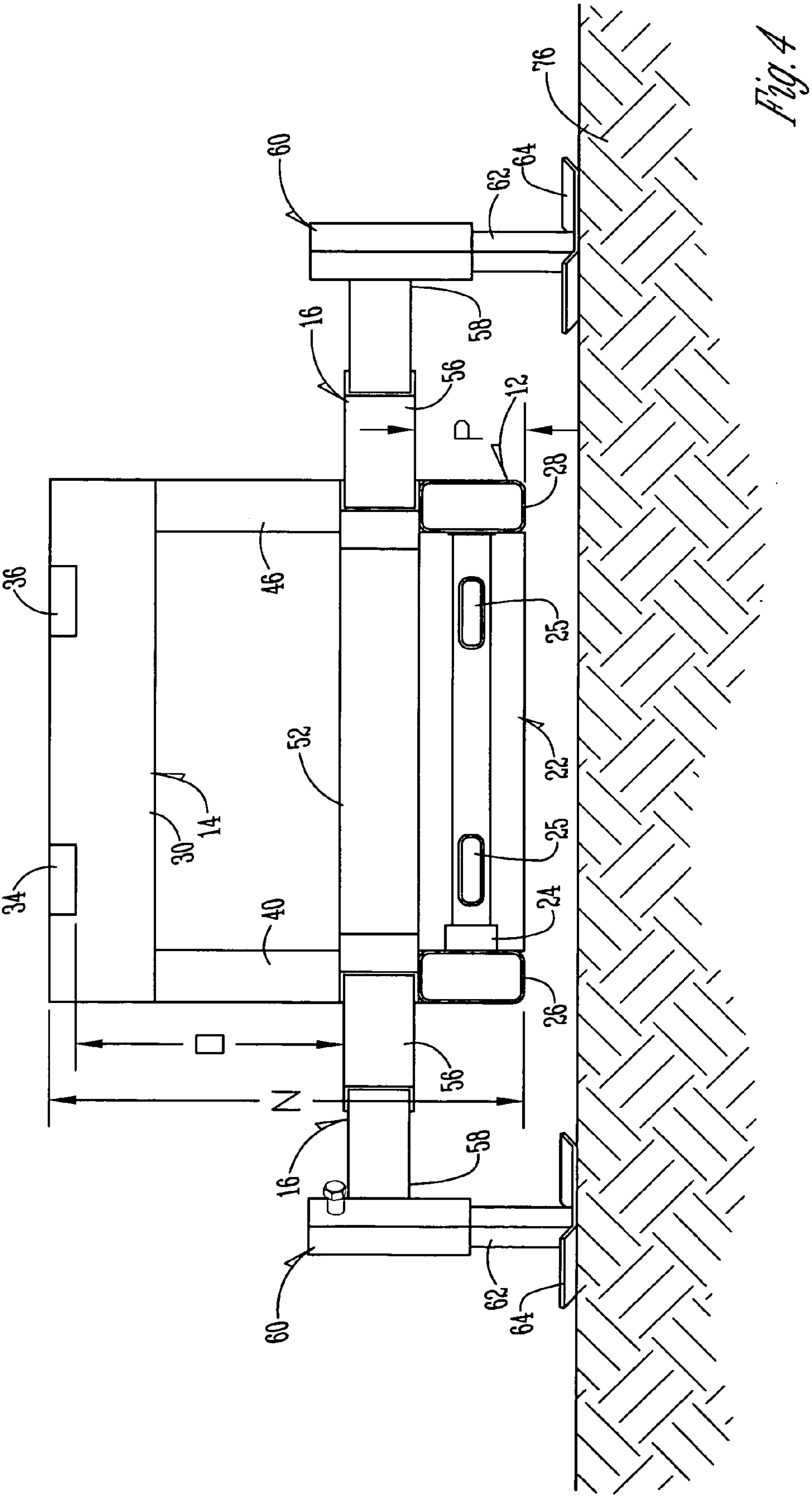
FIG. 4 is a side, elevational view of the base of FIG. 1 positioned on a generally flat ground area.

FIG. 4 also illustrates the height of base 10. Reference letter N indicates the height between the bottom plane of bottom 12 and the top plane of top 14 to be 60". Reference letter O indicates the distance between the top of outriggers 16 and just below the top plane of top 14 to be 36" minimum. This could be extended upwardly if desired.

FIG. 4 also shows that outrigger jacks 60 extend so that feet 64 extend below the plane defining the bottom of bottom 12 of base 10. It is preferable that when installed, no part of base 10 contact the ground and that it be entirely supported by feet 60 of outrigger 16 to get maximum stability and resistance to overturning moment.

Figure 5:
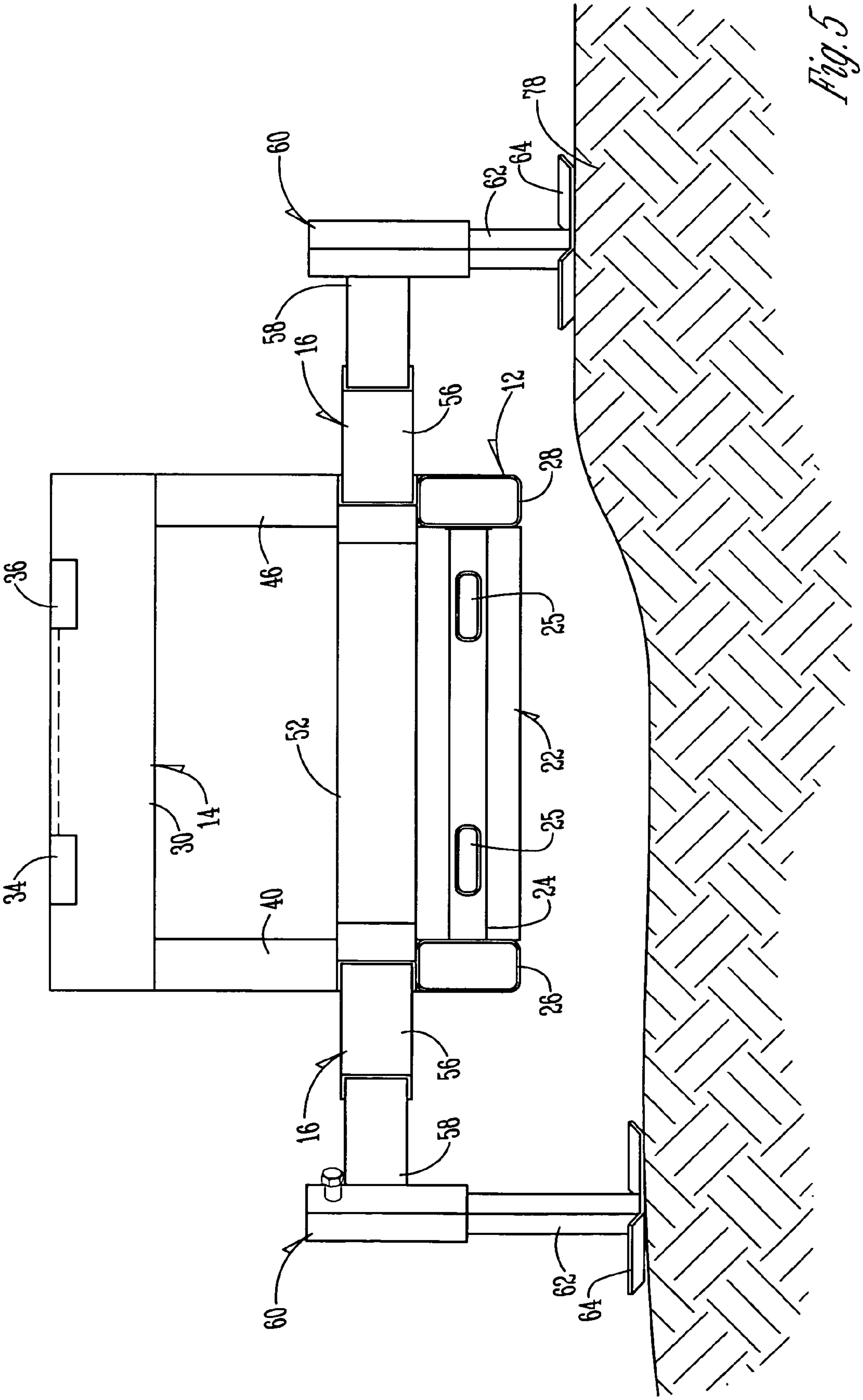
FIG. 5 is similar to FIG. 4, but shows the base located on uneven ground.

FIG. 4 shows base 10 on a generally flat surface 76, such as the ground. In comparison FIG. 5 illustrates uneven ground 78. Jacks 60 can be operated to keep base 10 level even if ground 78 is not.

Figure 6:
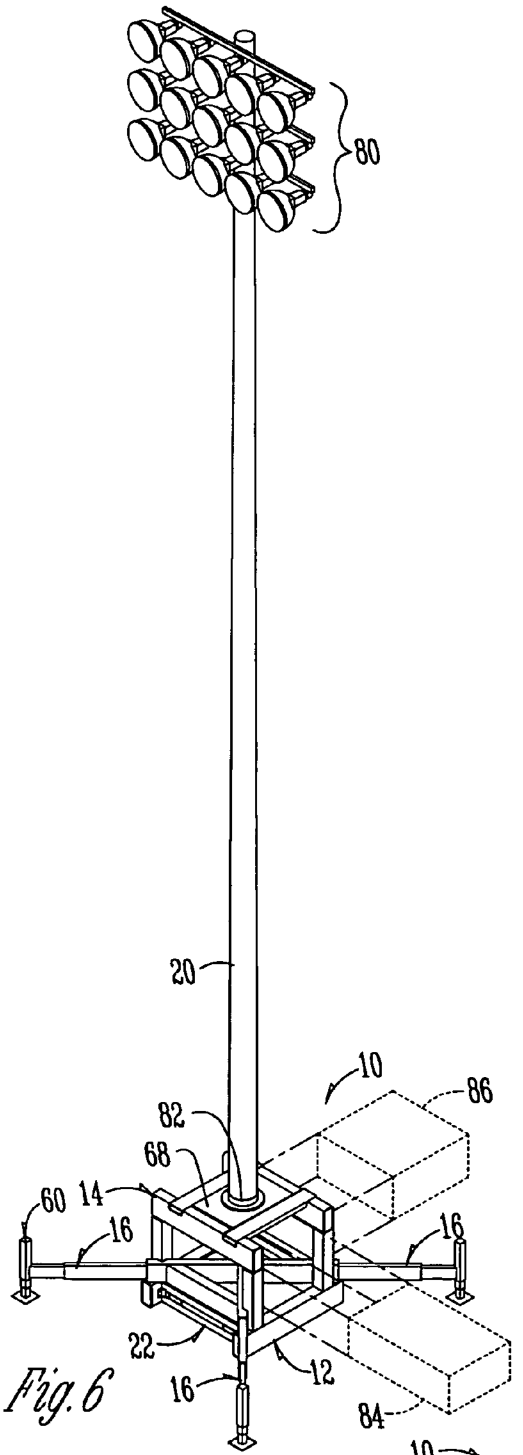
FIG. 6 is a reduced perspective view of the embodiment of FIG. 1 used in conjunction with a light pole and an array of light fixtures.

FIG. 6 illustrates base 10 of FIGS. 1-5 in combination with a pole 20 which suspends an array 80 of light fixtures. Array 80 comprises a set of cross-arms which are attached to the upper end of pole 20 by a means known within the art. In this embodiment pole 20 is hollow and made of tubular steel. It is attached to flange 82 at its bottom which is in turn fixed to plate 68 which is removably attachable to base 10.

Pole 20 can be of various lengths. One possible range of lengths would be 40' to 80'. The number of fixtures of the array 80 can vary, but usually would be anywhere from one (1) to twelve (12) fixtures. The object depicted in ghost lines by reference numeral 84, is intended to represent a device that can be placed into the space between top 14 and bottom 12 of base 10. In this example, device 84 could be an electrical power generator (self-contained, diesel powered) that could be removably positioned into base 10 and serve to operate lighting fixture array 80. Ghost lines 86 are intended to represent another device that could be placed into base 10 such as ballasts for the light fixtures or other electronic or electrical components used in the operation of array 80. It is to be noted and understood that such things as an electrical power generator is of substantial weight and could also act as an additional weight to assist in resistance of overturning moment and stability of base 10.

In operation the invention works as follows. Base 10 would be pre-constructed. As mentioned, it is of a size that could be transported to a site by convention over-the-road transportation. Prior consideration would be made of the specific structure with which base 10 will be used. Sufficient weight in the form of, for example, of concrete 22, additional weight 70, or devices 84 and 86 would be sent along with base 10, or available at the site.

Once at the site, base 10 could be manipulated by forklifts and other equipment to be placed in position on the ground or whatever other supporting surface is desired. Pre-determined add-ons such as weight or other devices or components would then be added to and attached to base 10. Outriggers 16 would then be extended and feet 64 brought into contact with the ground. The jacks 60 would be adjusted to bring base 10 off the ground, usually to a level orientation. The base would then finally be configured appropriately based on the device to be supported, and then the device to be supported would be mounted onto the top of base 10. In the foregoing example, a crane or some sort of a lifter device would raise pole 20 and array 80 vertically, move it over to above base 10, and then bring it down and mount it to the top of base 10. Any fine-tuning adjustment could be made, even after the structure to be supported (here pole 20 and array 80) is attached to base 10.

In this example, a generator 84 is added into base 10. The appropriate electric wires (in this example, pre-wired from array 80 down to the bottom of pole 20) could simply be electrically connected accordingly and the lighting array 80 could then be operated. It would be a self-contained lighting unit. The outriggers and weight in base 10 would have a pre-determined level of overturning moment resistance to handle whatever environmental standards exist for the site. This would include for certain configurations, winds on the order of 60 mph, or greater.

The apparatus operates on the physical principle that $$\Sigma\mu=0 \text{ or (static equilibrium)}=FL-WX$$

where μ is the sum of the moments, F represents the forces acting on the pole in a direction, L is the vertical distance from the top of the structure being supported to the ground, W is the total weight of the system, and X is the radius of Circle M, pictured in FIG. 3 (or the length of outriggers 16). From this equation, one could either determine how far apart the outriggers would be placed and then add weight to the system accordingly. Alternatively, one could determine the weight of the system, and then vary the distance of the outriggers. Both of these calculations would be made to withstand the maximum anticipated wind force. Static equilibrium is the condition where any more load to base 10 starts to heel it up.

The main variable is F, which is primarily wind loading. One can solve for any of the variables. Therefore, for any assumed wind load F, and any assumed outrigger extension X, the weight W needed to prevent overturning can be determined. Or for a given total weight, the length of outrigger can be determined.

The wind moment number is calculated based on standard building and structural codes for a particular configuration. Dividing the wind moment by the base moment arm results in the weight of the unit required to resist overturning. Since the operator or technician knows (a) the weight of his unit, (b) the fixture mounting height, (c) the number of fixtures, and (d) the EPA of the fixtures, he can determine from the charts what wind speed can be sustained based on his minimum moment arm (or outrigger) setting.

A booklet of charts can be produced which provides an operator with the information needed to set up the configuration to withstand certain winds. The charts would allow the operator to set the extension lengths of the outriggers and/or the amount of weight of the whole combination to meet the selected overturning resistance. The total weight would include the weight of everything associated with the base 10, including the pole, the fixtures, the mounts for the fixtures, the fixture control mechanisms, electrical and electronic components, as well as the base 10 itself and anything inserted into the base 10. For example, a 60' tall pole can weigh 720 lbs., six (6) fixtures can weigh 150 lbs., controls and electrical components add 420 lbs. Base 10 can weigh on the order of 2,000-3,000 lbs. An electrical generator placed in base 10 could weigh on the order of 1,600 lbs. If outriggers are added, they could add 600 lbs. Then, if concrete add-on weights are added, they could add 7,200 lbs. to the total weight. See FIG. 16 for an example of the type of chart that could be prepared for a 60' tall pole, with six (6) fixtures.

The included preferred embodiment is given by way of example only and not limitation. Variations obvious to those skilled in the art are included within the invention which is solely described by the claims herein.

D. Options, Features and Alternatives

Figure 7:
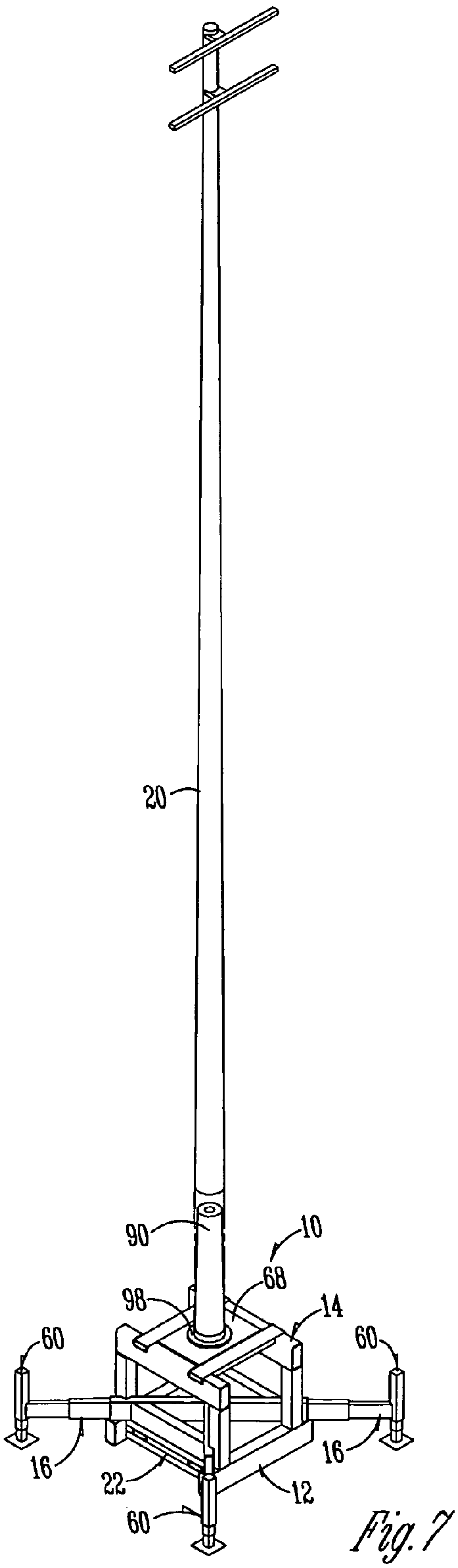
FIGS. 7 and 8 are similar to FIG. 6, but show in more detail a hollow pole positioned over an upward extending stub (FIG. 7) and the slip-fit of the hollow pole over the stub (FIG. 8) as a means of attaching a pole to the base.
Figure 8:
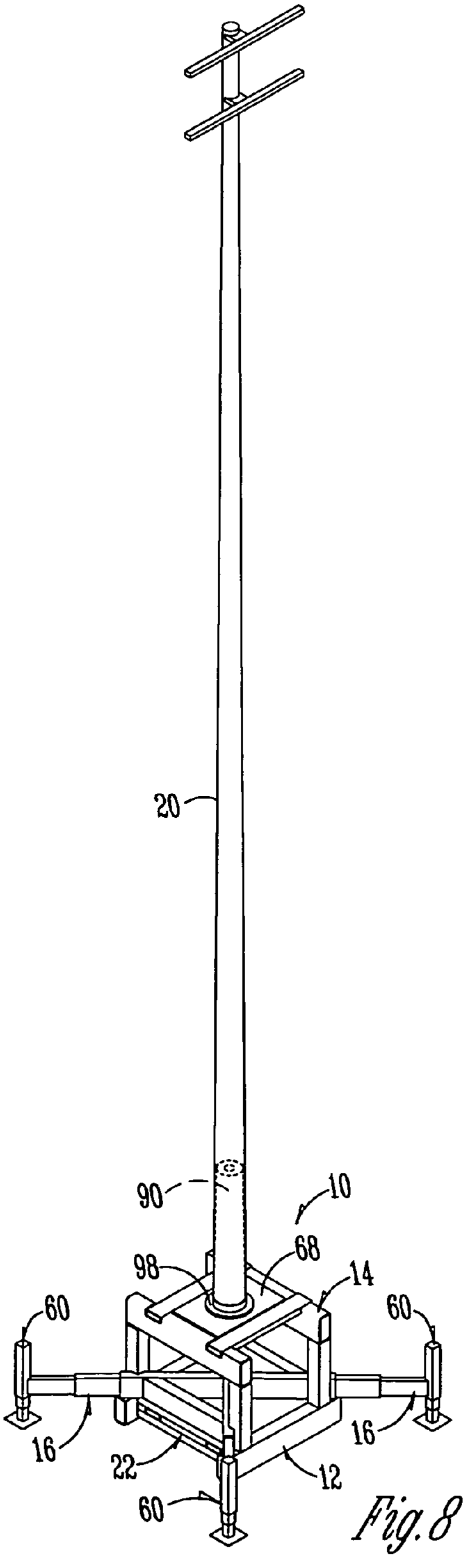

FIGS. 7 and 8 illustrate an alternative method of attaching a pole 20 to base 10. In this example pole 20 is a hollow, tapered, steel pole. Tapered stub 90 can be concrete, steel, or other material. Stub 90 can be attached via a flange 98 to a plate similar to plate 68 previously described and fixed to base 10. As illustrated in FIG. 7, pole 20 can be attached or detached from stub 90 simply by slip-fitting it over stub 90 or removing it therefrom. The weight of pole 20 and any attachments would keep it in place so no locking mechanisms are needed. Such an arrangement would be similar to that disclosed in U.S. Pat. No. 5,398,478 which is incorporated by reference hereto.

FIG. 8 shows pole 20 seated down on stub 90. One advantage of this arrangement is that prior to seating onto stub 90, pole 20 can be rotated around stub 90 to orient any elevated structure in a specific direction. This is especially valuable when aiming an array of lights in a certain direction.

Figure 9:
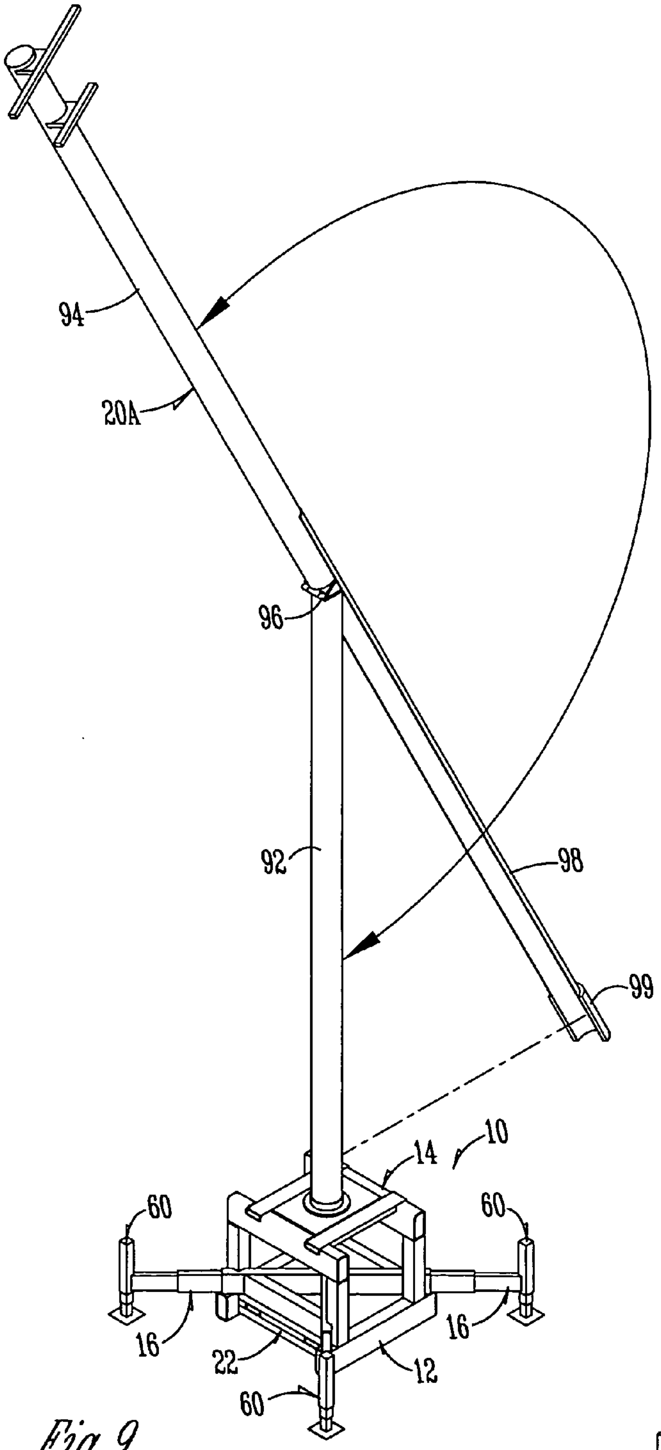
FIGS. 9 and 10 are similar to FIG. 6, but show a pole hingeable along its length which can be pivoted down for access to the top of the pole.
Figure 10:
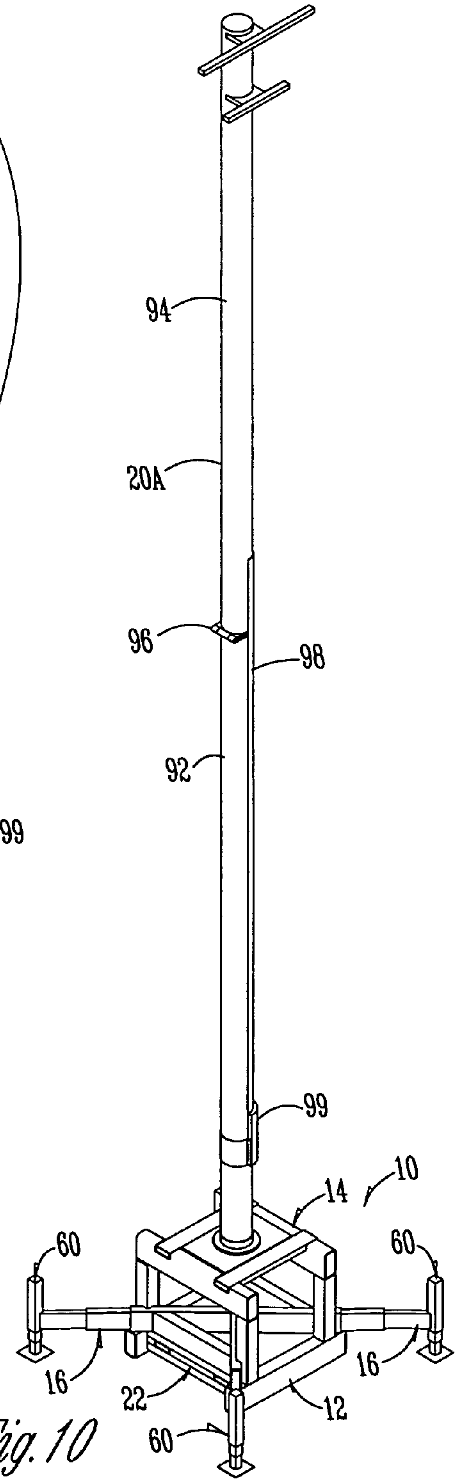

FIGS. 9 and 10 illustrate another embodiment of a pole 20. Pole 20 could be attached to base 10 by a number of different ways. In this embodiment pole 20 includes a lower section 92 attached to base 10 and an upper section 94. Sections 92 and 94 are interconnected by a hinge 96. Upper section 94 includes a tail 98 which at its very bottom further includes a weight 99. As indicated by the arrow in FIG. 9, weight 99 helps upper section 94 pivot to a vertical position in normal use. Some sort of locking mechanism (not shown) could lock pole 20 in its normal vertical position (FIG. 10). However, if servicing or access to the top of pole 20 is desired, tail 98 could be released and the top of upper section 94 pivoted downwardly. This could be accomplished in a number of ways including some sort of a cable system. The use of weight 99 would allow for smooth, controlled pivoting.

Figure 11:
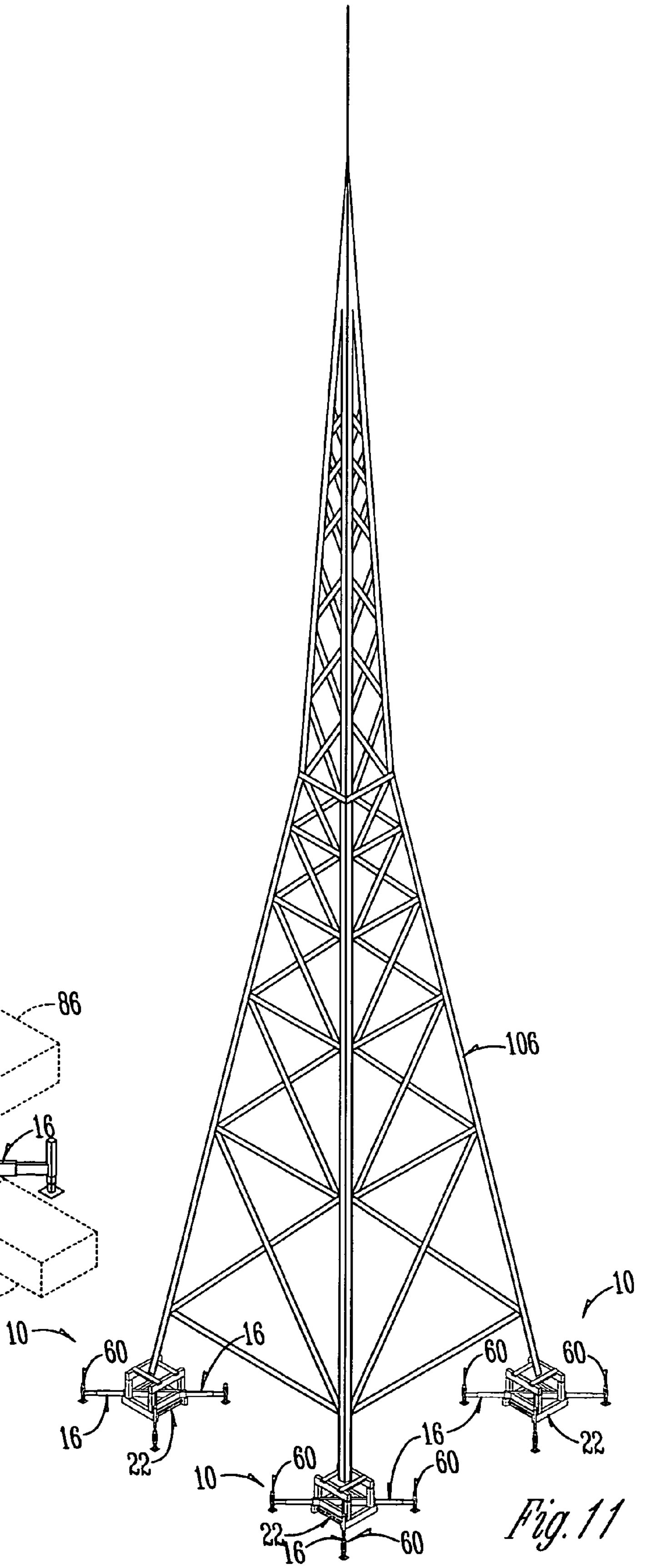
FIG. 11 is a reduced perspective view of a plurality of bases similar to FIG. 1 used to support the four lower ends of a vertical tower.
Figure 12:
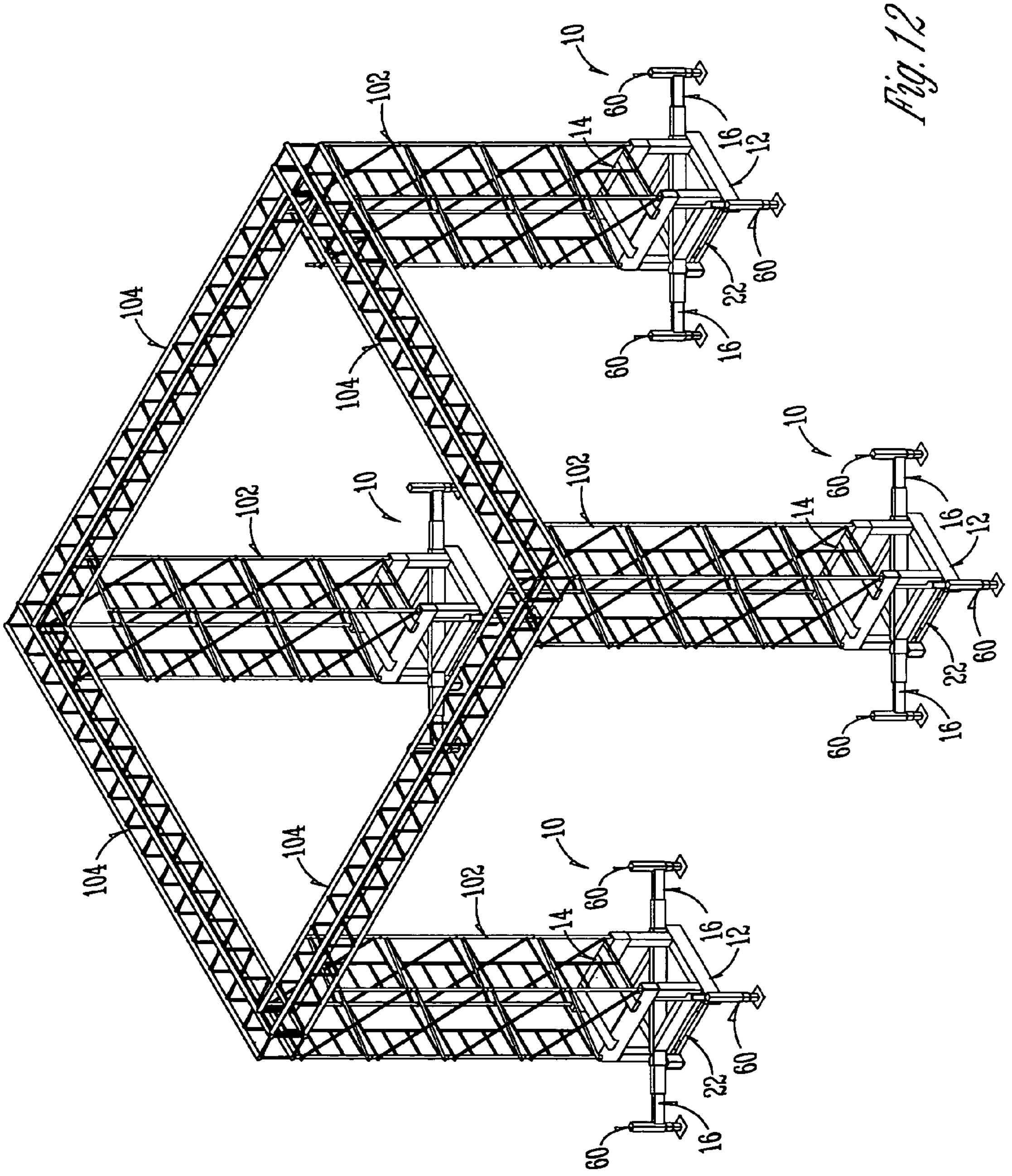
FIG. 12 is a perspective view of the use of a plurality of the portable bases of FIG. 1 to support a plurality of legs of a scaffold and truss arrangement.

Another method of use of bases 10 would be a plurality of bases 10 to support a larger structure such as shown in FIGS. 11 and 12. Each base 10 would support a corner of a vertical tower 106 (FIG. 11) or a scaffold 102 (FIG. 12). The scaffolds 102 in FIG. 12 in turn would support trusses 104. Therefore, multiple bases 10 could provide temporary spread footings for a large super-structure.

As has previously been discussed, the intentional creation of openings or space between the top and bottom of the base 10 allows for any variety of interchangeable and removable inserts. They can be functioning components or simply weight.

With regard to weights 22 and 70, it has been shown that a concrete block having steel facings on edges could be used. Alternatively, concrete with internal steel reinforcement like re-bar or re-rod could be used.

It could also be appreciated that weights such as weight 22 and weight 70 are inserted or recessed inside the perimeter of frame 10 so that they are inside the boundary of the overturning moment resistance. It also makes the weight closer to the center of the structure to make it easier for a forklift to lift and move the entire unit. This could occur with weights 22 and 70 attached to base 10 and even when a structure, such as a pole and light arrays is attached to base 10.

Another option would be to add a running gear to base 10 so that it could be pulled like a trailer. On the other hand, as discussed, bases 10 can be placed in conventional over-the-road transportation and could even be stacked on one another or nested somehow. Slots such as slots 25 or hooks (see 71 in FIG. 2) could be built into weights 22 and 70 to make them easier to manipulate and move by forklifts and other equipment.

FIGS. 13, 14, 15 and 15A illustrate an optional feature for outriggers 16. Tubes 56 and 58 can telescopically extend from an end of base cross tubes 48 or 50 by nesting within one another as shown. A pivoting member or dog 160 is pivotable around pin 162 which is secured transversely across the proximal end of a longitudinal slot 164 in arm 56. A similar slot 166 exits in arm 58 but without a dog. Pivot pin 162 can be held in place by a thin cover plate 163 (welded or otherwise connected to the exterior of tube 56).

Figure 13:
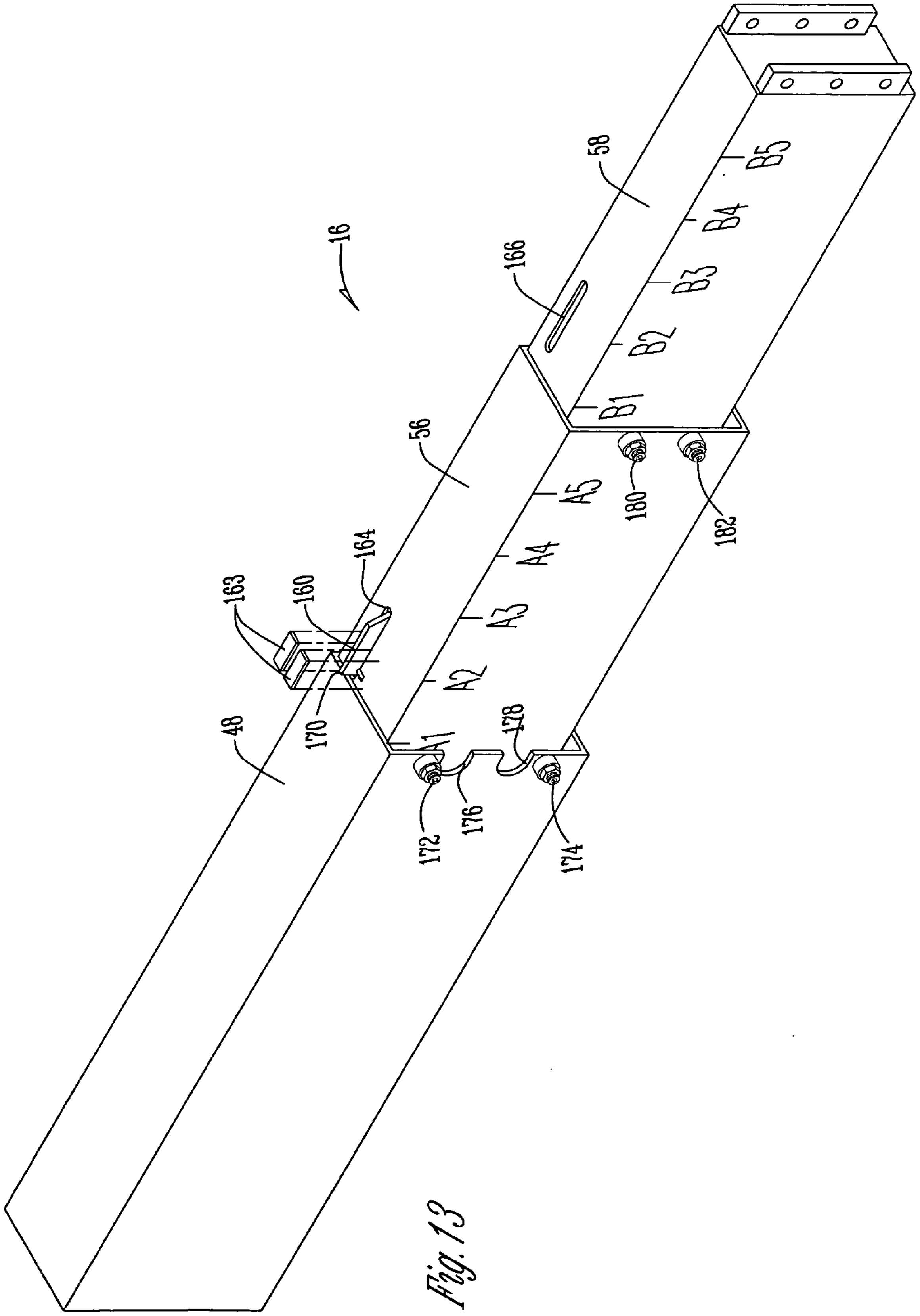
FIG. 13 is an enlarged perspective view of an outrigger of FIG. 1.
Figure 14:
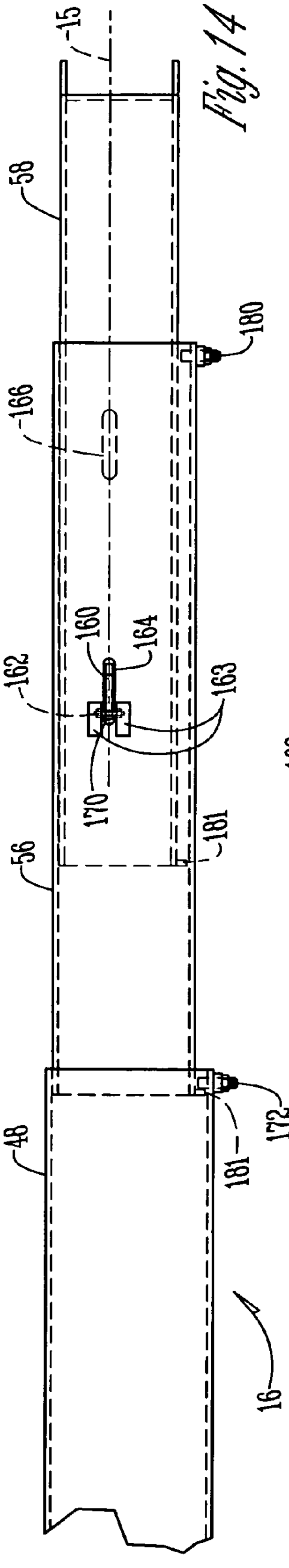
FIG. 14 is a still further enlarged partial top plan view of FIG. 13.
Figure 15:
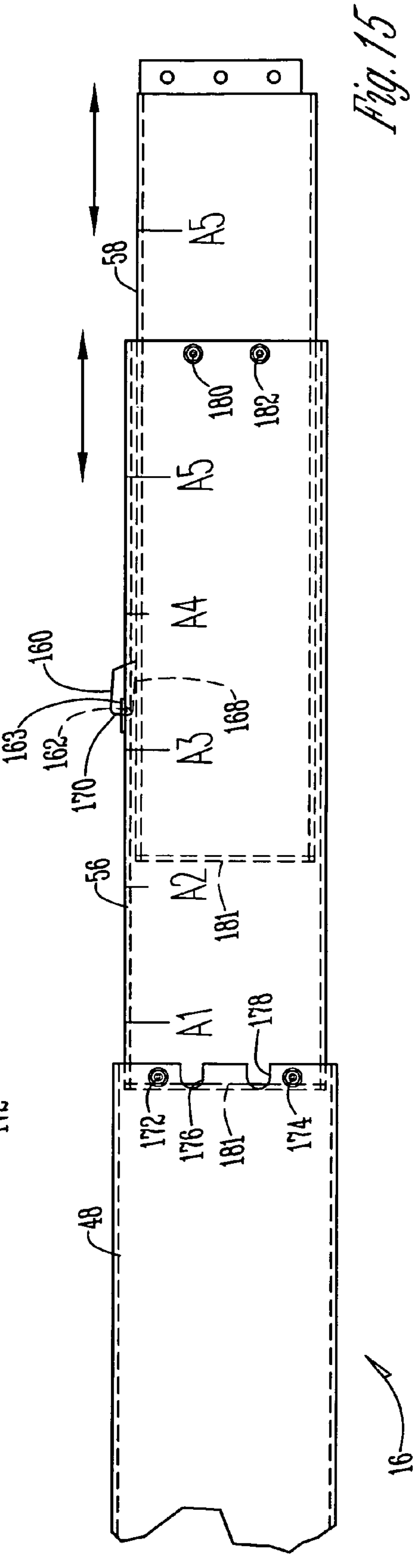
FIG. 15 is an elevational sectional view taken along line 15-15 of FIG. 14 showing the outrigger extended.
Figure 15A:
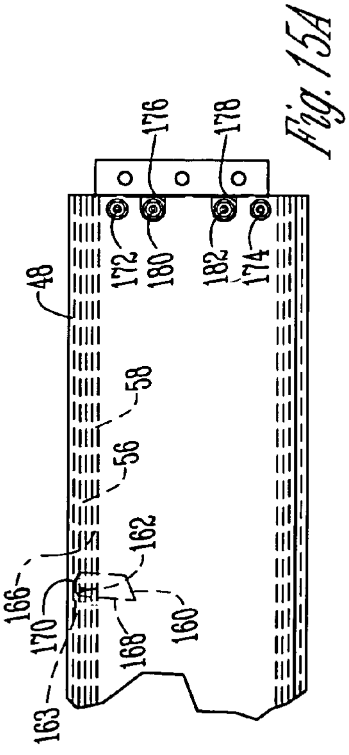
FIG. 15A is identical, but showing the outrigger retracted.

Dog 160 and slots 164 and 166 cooperate to require that arm 56 be pulled out into and inserted from tube 48 or 50 first, that is relative to arm 58. When arms 56 and 58 are fully extended, as shown in FIG. 13, dog 160 is pivoted up so that its edge 168 rides on top of the top outer side of arm 58. Edge 170 of dog 160 therefore creates a stop disallowing arm 56 from being pushed into tube 48. Arm 58 is free to be pushed into arm 56. Therefore, when it is desired to retract arms 58 and 56, dog 160 allows arm 58 to be retracted first until slot 166 of arm 58 aligns directly below slot 164 in arm 56. When so aligned, the free end of dog 160 by gravity pivots down (see ghost lines 160 in FIG. 15) and dog 160 no longer blocks arm 56 from retracting into tube 48.

Conversely, when arms 56 and 58 are retracted into tube 48, because dog 160 extends through slots 164 and 166, it requires that both arms 58 and 56 move out from tube 48 if either are pulled in that direction, until dog 160 clears tube 48, at which point dog 160 would pivot up and allow arm 58 to retract from arm 56.

Set-screws 172 and 174 in the side of arm 56 mate into cut-outs 176 and 178 in tube 48 when arm 56 is fully retracted into tube 48 and serve to disallow further inward movement of arm 56. Set-screws 176 and 178 are also used to deter rattles between tubes 48/50 and arms 56 and 58 once positioned in place. Set-screws 180 and 182 in tube 48 also serve to deter arms 56 or 58 from moving once positioned. Arms 56 and 58 are disallowed from being completely pulled out and separating from its succeeding part by set-screws, but can be pulled completely out if needed for maintenance or replacement.

Further, a pre-determined system for installing base 10 relative to different structures it supports and environmental conditions could optionally be created. For example, through empirical testing, a chart could be created for poles of varying heights with varying numbers of light fixtures. The chart would indicate how much weight should be contained on base 10 and how far outriggers 16 should be extended to provide the appropriate resistance to overturning moment. It would also include the amount of necessary resistance to overturning moment based on an anticipated range of wind velocities. With this chart it would allow the installer and user of the system to configure base 10 to meet or exceed the needs for a particular use without having to do independent testing and without substantial over-compensating with regard to weight and extension of outriggers.

A leveling device or devices could be added to base 10. In one simplistic form, level bubbles such as are used with carpenters' levels could be placed around the perimeter of base 10. The operator could visually see when base 10 is leveled.

Operation of adjustable jacks 59 could enable the leveling. Note that jacks 59 could be manually vertically adjustable. Alternatively, as shown in FIG. 1, jacks 59 could have a hex nut (1½") 140 over which fits a mating air wrench socket 142. Operation of air wrench 144 would allow the operator to turn nut 140 which would raise or lower foot 64 of jack 59. Still further, it is possible to have portable gear motors directly on jacks 59 which could be powered electrically to raise or lower jacks 59.

Foot 64 could be 2' by 2' to diminish soil compaction.

For example, a chart (e.g. FIG. 16) would begin with certain assumptions, including, the type, configuration and height of pole, the number of light fixtures suspending at the mounting height of the pole, and the EPA (equivalent pressure area) of such the pole and fixtures when erected. Then, through testing or modeling, the wind load could be calculated for different extensions of the outriggers versus different total weight of the configuration. Appropriately graphed, the operator would be able to survey nearly any site for erection of the invention, and select the outrigger extension length and weight to resist overturning of the configuration for a given wind speed. Alternatively, the outrigger extension and amount of weight needed to be transported to the site of erection of the configuration could be pre-calculated at the storage location of the device. The necessary components could then be loaded on a truck, transported to the erection site, and then erected according to the predetermined settings.

There are times when the desired placement of the invention does not allow full extension of the outriggers. An example would be if the invention needed to be positioned next to a fence or building. Even if only one outrigger can not be extended to the length of the others, the resistance to overturning is decreased to that of the shortest extended outrigger. In this situation, more weight could be added to the invention to compensate for the restriction on outrigger extension.

On the other hand, the more the outriggers can be extended, the less total weight is needed. Therefore, there are times when less weight needs to be transported and manipulated to achieve the desired resistance to overturning.

Different charts can be created for different configurations (e.g. for different pole type/heights, difference fixture types/numbers, different EPAS, etc.).

Markings could be placed on the outrigger arms 56, and 58 (see FIG. 1), which could match up with the charts. The operator would only have to look up the desired overturning resistance and extend the outriggers to the corresponding marking. For example, the markings could letters and/or numbers.

FIG. 16 is a depiction of such a chart 190 showing how heavy the total assembled base, pole, and elevated structure must be and how far the outriggers must be extended to support a 60' light pole, with six (6) fixtures attached to the pole, each fixture having an EPA of 4.0 at varying wind speeds. This example 190 shows that the indicia 192 (the data on the client) can quickly and easily be referred to by the used on-site and can therefore eliminate certain testing or experimentation that might otherwise be required. FIG. 16 illustrates generally a few different outrigger arm lengths and total system weight that could be used for a certain pole height, fixture type, fixture EPA, etc. Charts could be created for smaller increments and for different pole heights, number of fixtures, EPAs, etc.

What is claimed:

1. A portable base for supporting structures that extend vertical distances of at least twenty feet comprising:

a framework adapted for separation and separate transport from a structure it is adapted to support;

the framework comprising a plurality of structural members formed into a box-frame capable of supporting at least 1000 pounds, the box-frame including a bottom and a top and a center axis through the bottom and top;

the framework including a connection to which a structure is removably attachable at or near the top; and the bottom and top defining a space therebetween into which can be placed one or more removable devices;

a power generator removably positioned in the space;

four outriggers telescopically extendible from the base outwardly, each of the outriggers independently extendable along different substantially radial directions from the center axis, each outrigger comprises an arm having a proximal end and a distal end, the proximal end connected to the framework, the arm being expandable over a range of positions between a first position where the distal end of the arm is nearest the framework and a substantial portion of the telescopically extendible arm is towards the center axis within the framework, and a second position where the distal end of the arm is farthest from the framework, so that resistance to overturning moment can be variably adjusted by variable addition of weight to the frame and variable adjustment of position of each outrigger.

2. The base of claim 1 wherein the framework is at least a plurality of feet wide by feet deep by feet tall.

3. The base of claim 2 wherein the framework width, depth and height fit within semi-trailer dimensions.

4. The base of claim 1 wherein the framework comprises tubular members.

5. The base of claim 1 further comprising a bottom including a mount for a weight, and a removable weight of at least several hundreds of pounds removably attachable to the mount.

6. The base of claim 1 further comprising an elongated pole having a lower end removably connected to the connection.

7. The base of claim 1 further comprising a scaffold having a lower end removably connected to the connection.

8. The base of claim 1 further comprising one or more weights removably attached to the frame in the space.

9. A portable spread footing comprising:

a framework;

the framework comprising a plurality of structural members formed into a box-frame capable of supporting at least 1000 pounds, the box-frame including a bottom and a top and a center axis through the bottom and top;

the framework including a mount to which an elongated pole is removably attachable and supported and wherein the elongated pole supports one or more light fixtures;

four outriggers telescopically extendible from the base outwardly, each of the outriggers independently extendible along different substantially radial directions from the center axis over a range of positions between a first position where a distal end of the arm is nearest the framework and a substantial portion of the telescopically extendible arm is towards the center axis within the framework, and a second position where the distal end of the arm is farthest from the framework, so that resistance to overturning moment can be variably adjusted by variable addition of weight to the frame and variable adjustment of position of each outrigger.

10. The footing of claim 9 wherein each outrigger includes a foot at or near the distal end of the arm, and an adjustment component on the arm to adjust the position of the foot relative to the arm.

11. The footing of claim 9 wherein the framework is at least a plurality of feet wide, deep and tall.

12. The footing of claim 9 wherein the bottom and top define a space therebetween into which can be placed one or more removable devices.

13. The footing of claim 12 further comprising a bottom including a mount for a weight, and one or more weights removably mounted on the framework at one or more of the bottom of the framework and the space between the bottom and top of the framework.

14. The footing of claim 9 wherein the framework bottom has a bottom-most plane, and outriggers have distal ends which are adjustable to extend below the bottom-most plane.

15. The footing of claim 9 wherein the top of the framework has similar perimeter dimensions to the bottom of the framework.

16. A moveable, portable light for wide area lighting comprising:

an elongated non-telescoping pole of at least twenty feet in length having upper and lower ends;

one or more lights mounted on the pole;

electrical leads operatively connected to each light through said pole;

a base comprising a plurality of structural members formed into a box-frame capable of supporting at least 1000 pounds, the box-frame having a top, bottom, and sides defining perimeter dimensions of the base and a center axis through the bottom and top adapted for separation and separate transport from the pole and lights;

a receiver positioned at or near the top of the base to which the lower end of the pole is releasably attachable;

four outriggers mounted on the base having distal ends which are telescopically adjustable relative to the base, each of the outriggers independently extendable over a range of positions in different substantially radial directions from the center axis between a first position where the distal end of the arm is nearest the framework and a substantial portion of the telescopically extendible arm is towards the center axis within the framework, and a second position where the distal end of the arm is farthest from the center axis, so that resistance to overturning moment can be variably adjusted by variable addition of weight to the frame and variable adjustment of position of each outrigger.

17. The light of claim 16 wherein the pole is at least a plurality of tens of feet long.

18. The light of claim 16 wherein the light are high intensity, high power wide area lighting fixtures.

19. The light of claim 18 wherein the lighting fixtures comprise arc lamps in reflectors.

20. The light of claim 16 wherein the base has at least one substantially open area between the top and bottom.

21. The light of claim 20 further comprising one or more removable weights placeable into the space.

22. The light of claim 21 wherein the total of the light is approximately 8,500 lbs. maximum.

23. The light of claim 20 further comprising electrical devices removable placeable into the space.

24. The light of claim 23 wherein the electrical devices include one or more of an electrical power generator, an electrical ballast; an electrical switch; an electrical control.

25. The light of claim 16 wherein the perimeter dimensions of the base fit within a conventional semi-trailer.

26. The light of claim 16 wherein the perimeter dimensions of the base are less than approximately 12' by 12' by 12'.

27. The light of claim 16 wherein the base weighs less than approximately 3,000 lbs.

28. The light of claim 16 wherein the base comprises a framework of tubular members, the bottom of the base comprising tubular members generally in a first plane, the top of the base comprising tubular members generally in a second plane generally parallel to the first plane, and the sides comprising tubular members connecting the top and bottom of the base.

29. The light of claim 28 wherein the framework is substantially open.

30. The light of claim 28 wherein the outriggers telescope from tubular members mounted on the frame work.

31. The light of claim 16 wherein the receiver comprises a stub fixed to the top of the base over which a structure can be slip-fit.

32. The light of claim 31 wherein the receiver comprises brackets into which a plate attached to a structure can be fit and retained.

33. The light of claim 31 wherein the receiver includes locking members.

34. A portable spread footing comprising:

a framework;

the framework comprising a plurality of structural members formed into a box-frame capable of supporting at least 1000 pounds, the box-frame including a bottom and a top and a center axis through the bottom and top;

the framework including a connection to which a structure is removably attachable at or near the top of the framework, the top of the framework having similar perimeter dimensions to the bottom of the framework, the top of the framework supporting the structure which has a lower end of similar perimeter dimensions to the top of the framework, wherein the structure is a truss;

four outriggers telescopically extendible from the base outwardly, each of the outriggers independently extendible along different substantially radial directions from the center axis over a range of positions between a first position where a distal end of the arm is nearest the framework and a substantial portion of the telescopically extendible arm is towards the center axis within the framework, and a second position where the distal end of the arm is farthest from the framework, so that resistance to overturning moment can be variably adjusted by variable addition of weight to the frame and variable adjustment of position of each outrigger.

* * * * *